United States Patent [19]

Peterson, Jr. et al.

[11] 3,833,067
[45] Sept. 3, 1974

[54] SPRING BIASED SCRAPER FOR DISK IMPLEMENTS

[75] Inventors: Willard Emanual Peterson, Jr., Colona; Charles Harold Youngberg, Moline, both of Ill.

[73] Assignee: Deere & Company, Moline, Ill.

[22] Filed: Oct. 30, 1972

[21] Appl. No.: 302,139

[52] U.S. Cl. ................ 172/566, 172/762, 172/753
[51] Int. Cl. .................. A01b 15/16, A01b 23/06, A01b 39/22
[58] Field of Search ................ 172/558–566, 172/610, 621, 570, 609, 684, 740, 748, 762, 719, 751, 753, 726; 267/73–74; 15/250.25, 250.27; 210/375; 403/384, 386, 398, 399

[56] References Cited
UNITED STATES PATENTS

| | | | |
|---|---|---|---|
| 487,120 | 11/1892 | Gilbert | 403/386 |
| 539,551 | 5/1895 | Sharp | 172/565 |
| 639,119 | 12/1899 | West et al. | 172/509 X |
| 760,742 | 5/1904 | Kennedy et al. | 172/566 X |
| 882,056 | 3/1908 | Folkerts | 172/560 |
| 1,017,109 | 2/1912 | Rieske | 172/566 |
| 3,045,765 | 12/1960 | Cox et al. | 172/566 |

FOREIGN PATENTS OR APPLICATIONS

| | | | |
|---|---|---|---|
| 84,882 | 1/1958 | Denmark | 172/265 |

*Primary Examiner*—Robert E. Bagwill
*Assistant Examiner*—Steven A. Bratlie

[57] ABSTRACT

Scraper apparatus for the soil engaging disks on a disk implement, the apparatus including a plurality of scraper arms, one for each disk, pivotally mounted at their upper ends on a support member for movement of their lower ends toward and away from their associated disks. The support member is adjustably mounted on the implement frame to afford common adjustment of the scraper arms radially with respect to the disks. A scraper blade is mounted on the cylindrical lower end of each arm by means of a U-shaped bracket extending through an aperture in the blade and rotatably receiving the lower end of the arm, the bracket having a pair of outwardly flanged legs engageable with the blade to limit movement of the blade radially relative to the arm, and the arm having a stop pin engageable with the edges of a circumferential slot in the bracket to limit axial movement of the blade relative to the arm. Each scraper arm includes an upper and lower spring anchor disposed above and below, respectively, the axis of the pivotal connection of the arm and support, each anchor having a plurality of spring anchor points thereon disposed at varying radial distances from the pivot axis. A spring connects the lower anchor on one of the arms with the upper anchor on the immediately adjacent arm to bias the scraper blades on the lower ends of both arms toward their respective disks, the spring being adjustable on the spring anchor points to vary the force of the blades against the disks.

5 Claims, 4 Drawing Figures

PATENTED SEP 3 1974 3,833,067

SPRING BIASED SCRAPER FOR DISK IMPLEMENTS

BACKGROUND OF THE INVENTION

The present invention relates generally to disk implements and more particularly to a spring biased scraper apparatus for the soil engaging disks on such an implement.

When disk implements such as disk harrows or the like are operated in certain types of adhesive soils, soil adheres to the surfaces of the disks and accumulates in the areas between adjacent disks, thereby substantially impairing the function of the implement. To combat this problem, scrapers are commonly provided to continually scrape the adhering soil from the soil engaging surfaces of the disks. Such scrapers have taken many forms and may be either of the fixed or spring biased type. Examples of various prior art scrapers are disclosed in U.S. Pat. Nos. 523,508, issued 28 July 1894 to Bauer et al., 717,698 issued 6 Jan. 1903 to Miller, 849,187 issued 2 Apr. 1907 to Beeman, and 822,056 issued 17 Mar. 1908 to Folkerts.

SUMMARY OF THE INVENTION

It is the primary object of the present invention to provide improved scraper apparatus of the spring biased type for the soil engaging disks on a disk implement such as a disk harrow or the like.

It is a further object to provide such apparatus wherein a single spring is utilized to simultaneously bias an adjacent pair of scrapers against their associated disks, and wherein adjustment means are provided for selectively varying the biasing force of either or both of the scrapers in said pair.

It is yet a further object to provide such apparatus having means for mounting a scraper blade on its supporting arm for limited rotation so that the blade is free to conform to the surface of the associated disk.

It is a still further object to provide such apparatus which is simple in design and economical to manufacture.

In pursuance of these and other objects, the invention comprises, generally, a plurality of scraper arms, one for each of the disks on the implement, pivotally mounted at their upper ends on a support member for movement of their lower ends toward and away from the soil engaging surfaces of their respective disks. Each arm includes an upper and lower pair of spring anchors disposed above and below, respectively, the axis of the pivotal connection of the arm and support member, and an elongated spring connects the lower anchor on one of the arms with the upper anchor on the immediately adjacent arm to simultaneously bias both arms toward their respective disks. The spring anchors are provided with a series of spring anchor points spaced at varying radial distances from the pivot axis of the arm so that the force exerted by the arm against its disk can be varied by changing the anchor point of the spring on the arm. Connected to the lower end of each arm is a scraper blade having an edge biased toward and engageable with the soil engaging surface of the disk, the connection means including a U-shaped bracket extending through an aperture in the blade and rotatably receiving the lower end of the arm. A pair of outwardly flanged legs on the bracket are engageable with one side of the blade, and the arm is engageable with the other side of the blade, to limit movement of the blade outwardly from the arm, while a pin removably received in the arm is confined within a circumferential slot formed in the U-shaped bracket to limit movement of the blade axially with respect to the arm.

BRIEF DESCRIPTION OF THE DRAWINGS

The preferred emboidment of the present invention will be described in conjunction with the accompanying drawings in which.

DESCRIPTION OF THE PREFERRED EMBODIMENT

Figure 1:
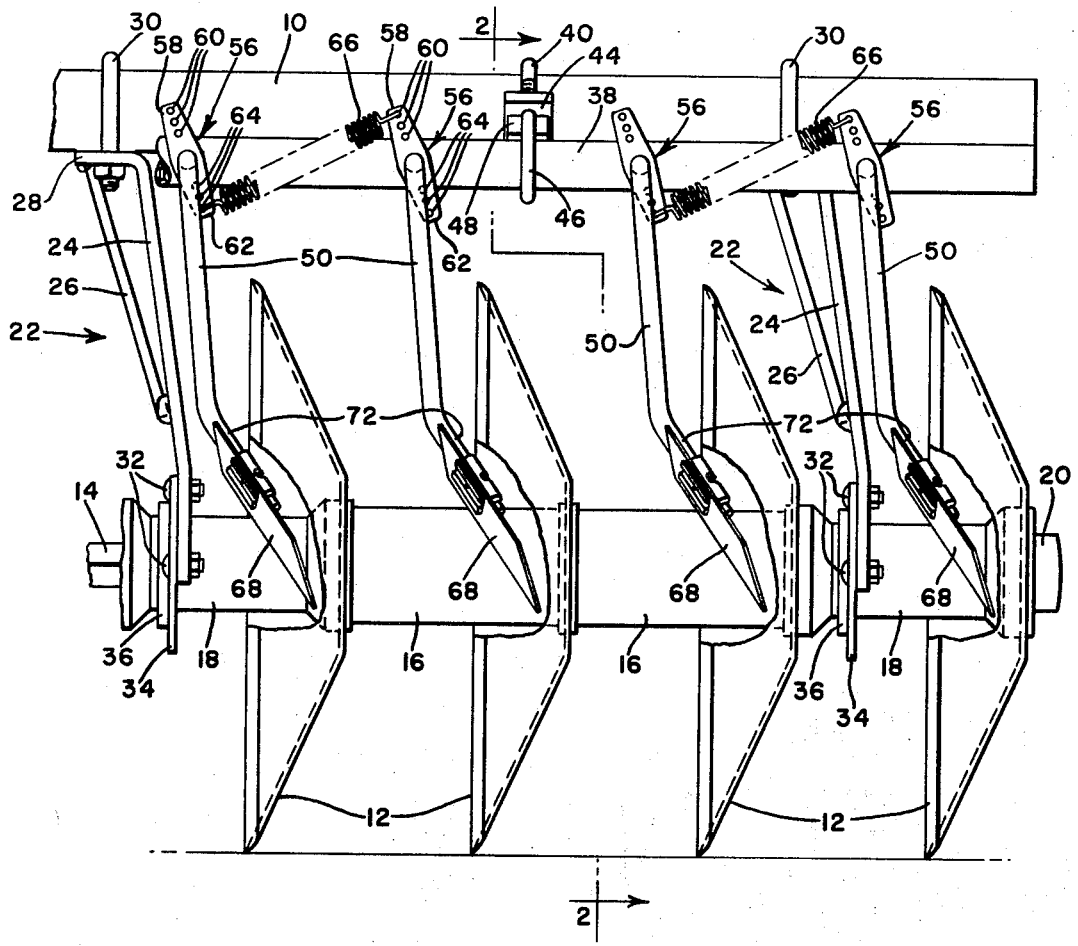
FIG. 1 is a fragmentary view of a disk gang on a disk harrow or the like, illustrating the disk scraper apparatus of the invention.
Figure 2:
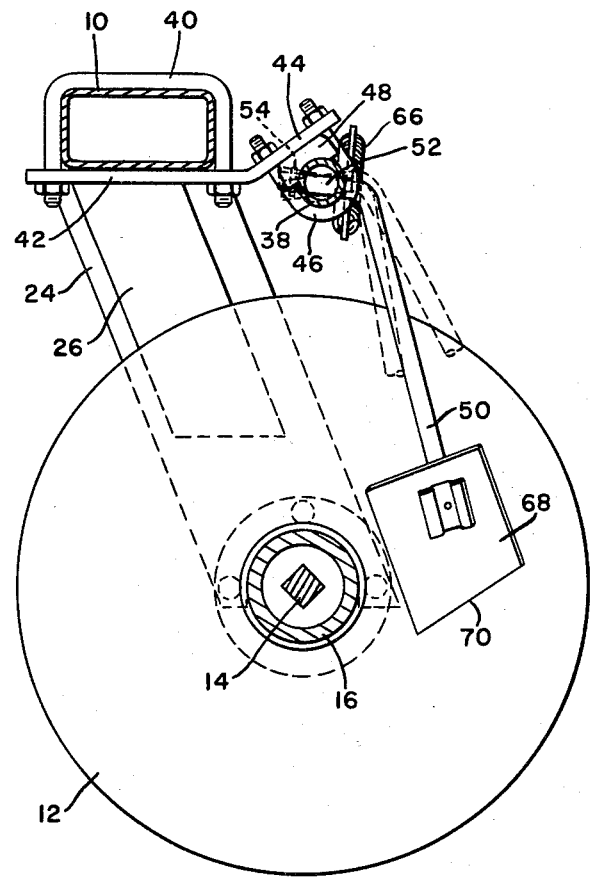
FIG. 2 is a section view of the disk gang taken along the line 2—2 of FIG. 1.

Referring now to the drawings, there is shown in FIGS. 1 and 2 a portion of a disk gang assembly incorporating the scraper apparatus of the invention. The assembly includes an elongated tubular gang frame member 10 which may, for example, be mounted on a wheel-supported main frame of conventional design, and which in turn supports a plurality of concave soil engaging disks 12 therebeneath for rotation about a common axis. The axis of rotation of the disks is defined by a gang bolt 14 which extends through the centers of the disk and through a plurality of cylindrical spacers 16 and 18 interposed between adjacent disk pairs. An enlarged head 20 formed on one end of the gang bolt 14 engages the disk on the outer end of the gang, while a nut (not shown) threaded on the opposite end of the bolt engages the disk on the inner end of the gang, to maintain the disks and spacers in a fixed relationship.

The disk gang is rotatably supported beneath the gang frame member 10 by means of vertical standards 22. Each standard consists of a formed plate 24 and a flat reinforcing member 26 welded at opposite ends to the plate member 24, the plate member 24 having a horizontal upper end portion 28 seated against the lower surface of the gang frame member 10 and secured thereto by a U-bolt extending across the top of the frame member 10 and downwardly through apertures in the horizontal end portion of the plate member 24. The lower ends of the standards are secured by means of bolts 32 to bearing flanges 34 on bearing members 36 comprising part of the spacers 18. The disk and spacer assembly is thus rotatably supported on the lower ends of the standards 22 by the bearing members 36.

The disk scraper apparatus of the invention comprises an elongated tubular support 38 adjustably connected to the gang frame member 10 along the rear side thereof. The connecting means for the support 38 comprises a U-bolt 40 which extends around the gang frame member 10 and secures a support plate 42, as shown best in FIG. 2, to the underside of the member, the support plate having an upturned end portion 44 extending rearwardly from the member 10. A U-bolt 46, in conjunction with a spacer block 48, releasably secures the tubular support 38 to the end portion 44 of the plate 42. As will subsequently appear, the U-bolt 46 may be loosened to permit adjustment of the scraper apparatus.

A plurality of scraper arms 50, one of which is associated with each of the disks 12, are pivotally supported at their upper ends in the tubular support 38 for movement of their lower ends toward and away from their associated disks. Each arm 50 is formed from a cylindrical rod and includes a cylindrical, generally horizontal upper end portion 52 which is rotatably received by aligned apertures in the walls of the tubular support 38. A removable pin 54 retains the arm in the support. Fixed to the upper end portion of each arm rearwardly of the support 38 is a vertically extending spring anchor bracket 56. Each bracket 56 includes an upper end portion 58 which extends above the axis of the pivotal connection of the arm 50 and support 38 and is provided with a series of three spring anchor points or apertures 60 disposed at increasing radial distances from the pivot axis, and a lower end portion 62 which extends below the pivot axis and is similarly provided with a series of three spring anchor points or apertures 64 disposed at increasing radial distances from the pivot axis.

The lower ends of each adjacent pair of scraper arms are biased toward the soil engaging surfaces of their associated disks by means of a single coil spring 66 which interconnects a spring anchor point 64 on the lower end of the spring anchor bracket on one of the arms 50 with a spring anchor point 60 on the upper end of the spring anchor bracket on the immediately adjacent arm. As illustrated in the drawings, the springs 66 interconnect the lowermost of the three spring anchor points 64 on one of the brackets 56 with the uppermost of the three spring anchor points 60 on the adjacent bracket 56. It will be appreciated that this location of the spring 66 will result in the maximum force being exerted by the lower ends of the arms 50 against the disks 12, since a moment arm of maximum length is thereby employed. The force exerted by either or both of the arms can be reduced by removing the ends of the springs to anchor points 64 and 60 which are located closer to the pivot axes of the arms 50. For example, to simultaneously reduce the force exerted by each of the arms in an adjacent pair served by one of the springs 66, the upper end of the spring would be removed to either the middle or lowermost anchor point 60 in the upper bracket end 58, while the lower end of the spring would be removed correspondingly to either the middle or uppermost anchor 64 in the lower bracket end 62. If it is desired instead to maintain the maximum force in one of the arms and to reduce the force in the other arm of the pair, only one end of the spring would be moved, to an anchor point closer to the pivot axis of the arm in which it is desired to reduce the scraping force. It will be appreciated that a large number of possible scraping force combinations may be achieved by changing one or both anchor points of each of the springs 66.

In the embodiment of the invention illustrated in FIG. 1 of the drawings, a single spring 66 connects the spring anchor brackets on alternate pairs of scraper arms 50, so that a single spring is utilized to bias a pair of scraper arms. It will be appreciated, however, that if a greater biasing force is desired, additional springs 66 would be added to connect the lower spring anchor on each arm with the upper spring anchor on the arm adjacent thereto, so that in effect one spring 66 would provide the biasing force for only a single arm 50.

Figure 3:
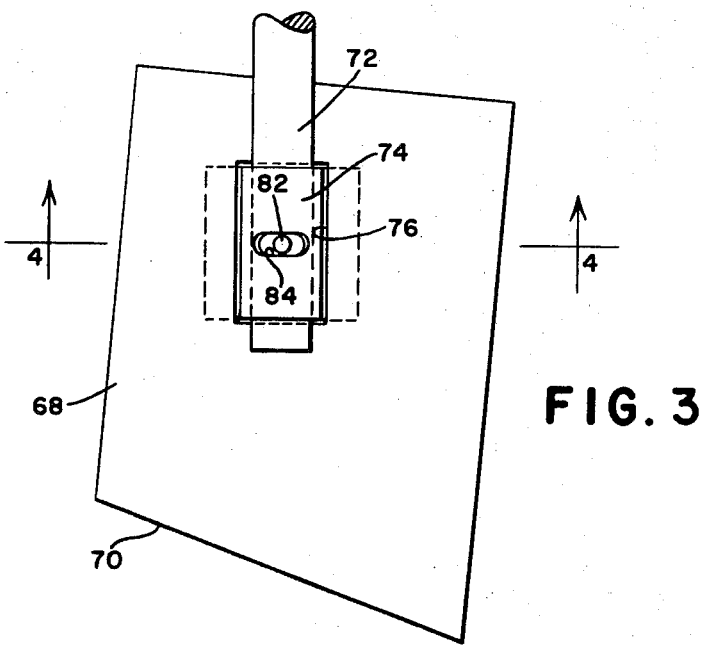
FIG. 3 is a view of the lower end of one of the scraper arms, illustrating the connection means between the arm and the scraper blade.
Figure 4:
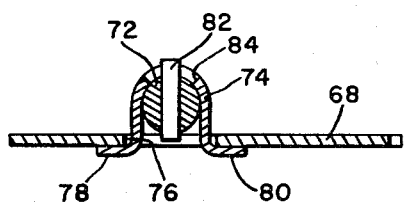
FIG. 4 is a section view taken along the line 4—4 of FIG. 3.

Mounted on the lower end of each of the arms 50 is a flat scraper blade 68 having an edge 70 normally disposed in scraping relationship with the soil engaging surface of the associated disk 12. Each blade 68 is mounted on its supporting arm 50 for limited rotation about the axis of the lower cylindrical end portion 72 of the arm 50, so that the edge 70 of the blade is free to conform to the surface of the disk. The means effecting the rotatable connection of the blade to the arm is illustrated in detail in FIGS. 3 and 4 of the drawings and comprises a U-shaped bracket 74 which extends through a rectangular aperture 76 formed in the blade 68 and receives the cylindrical lower end of portion 72 of the arm 50 for limited rotation. U-shaped bracket 74 includes a pair of outwardly flanged leg portions 78 and 80 which are engageable with the underside of the blade 68 to limit movement of the bracket through the aperture in one direction, while the end portion 72 of the arm 50, when in place in the bracket 74, is engageable with the top side of the blade to limit movement of the bracket through the aperture in the opposite direction. The blade 68 is retained in place axially with respect to the arm by means of a pin 82 removably received in the arm portion 72 and extending into a circumferential slot 84 formed in the bracket 74. The pin 82 is engageable with the circumferential edges of the slot 84 to limit axial movement of the blade relative to the arm in either direction, and is engageable with the ends of the slot to limit rotation of the blade about the axis of the arm portion 72.

As indicated in dashed lines in FIG. 2 of the drawings, the scraper arm tubular support member 38 may be rotated about its axis to simultaneously adjust the positions of the scraper arms 50 radially with respect to their associated disks 12. Such adjustment is effected by loosening the nuts on the U-bolt 46, rotating the support member 38 to the desired position, and retightening the nuts. In addition, it will be apparent that the force exerted by the arms against their disks can be varied simultaneously independently of the spring anchor point adjustment previously described, by adjusting the position of the support member 38 axially relative to the gang frame member 10.

We claim:

1. In combination with a disk implement having a frame and at least a pair of soil-engaging disks supported thereon for rotation about a common axis, disk scraper means comprising: a scraper arm associated with each disk and having upper and lower ends, each lower end having a cylindrical shape; means pivotally mounting the upper end of each scraper arm on the frame for movement of the lower end thereof toward and away from its associated disk; an upper spring anchor fixed to one of said scraper arms and disposed above the axis of the pivotal mounting of said one arm and said frame; a lower spring anchor fixed to the other of said scraper arms and disposed below the axis of the pivotal mounting of said other scraper arm and said frame; a spring connecting said upper and lower spring anchors and urging said anchors toward each other, said spring being operated to bias the lower ends of the scraper arms towards their respective associated disks; a scraper blade disposed on one side of the lower end of each of said scraper arms having an edge engageable with its associated disk, said blade having an aperture formed therein; a U-shaped bracket extending around the cylindrical lower end of each of said scraper arms and through the aperture in its associated blade and having a pair of outwardly flanged legs engageable with the side of the blade opposite that on which the scraper arm is disposed, to limit movement of the blade radially relative to the scraper arm, each of said brackets having a slot formed therein extending circumferentially with respect to the arm; and a pin removably received in the lower end of each of said scraper arms and extending radially into the slot and being freely movable therein upon pivotal movement of said blade engageable with the circumferentially extending edges of said slot to limit movement of the blade axially relative to the scraper arm.

2. The invention defined in claim 1 wherein said means pivotally mounting the upper end of each scraper arm on the frame for movement of the lower end thereof toward and away from its associated disk comprises: a scraper arm support elongated in the direction of the common axis of rotation of said disks; means pivotally mounting the upper end of each scraper arm on said scraper arm support; and means mounting said scraper arm support on said frame for adjustment of said support relative to said frame along the axis of elongation of said support, whereby the lower ends of said scraper arms are commonly adjustable toward and away from their associated disks.

3. The invention defined in claim 1 wherein at least one of said upper and lower spring anchors includes a plurality of spring anchor points disposed at different radial distances from the axis of the pivotal mounting of the associated arm and frame, whereby the biasing force exerted on said arm by the spring means can be varied by changing the anchor point of the spring.

4. In combination with a disk implement having a frame and at least one ground engaging disk rotatably supported thereon, scraper means for said disk comprising: a scraper arm having upper and lower ends, the lower end having a cylindrical shape; means pivotally mounting the upper end of said arm on said frame for movement of the lower end toward and away from said disk; a spring carried on the frame and acting on said scraper arm to bias the lower end thereof toward said disk; a scraper blade mounted on the lower end of said scraper arm and having an edge biased toward and engageable with said disk, said blade having an aperture formed therein; a U-shaped bracket with outwardly flanged legs extending through said aperture and rotatably receiving the cylindrical lower end of said scraper arm, the outwardly flanged legs of said bracket being engageable with one side of said scraper blade and the scraper arm being engageable with the other side of said blade, to limit movement of said blade radially relative to said scraper arm, said bracket further having a slot formed therein behind said blade, said slot extending circumferentially with respect to the arm; and a removable pin in said scraper arm received in said slot and being freely movable therein upon pivotal movement of said blade about the arm for permitting self-positioning of the blade in accordance with the surface of its disk, said pin being engageable with the circumferentially extending edges of the slot for limiting movement of the blade lengthwise of the arm.

5. In combination with a disk implement having a frame and at least one ground-engaging disk rotatably supported thereon, scraper means for said disk comprising: a scraper arm having upper and lower ends, the lower end having a cylindrical shape; means pivotally mounting the upper end of said scraper arm on said frame for movement of the lower end toward and away from said disk; a spring carried on the frame and acting on said scraper arm to bias the lower end thereof toward said disk; a scraper blade disposed on one side of the lower end of said scraper arm and having an edge engageable with said disk, said blade having an aperture formed therein; a U-shaped bracket extending around the cylindrical lower end of said scraper arm and through the aperture in said scraper blade and having a pair of outwardly flanged legs engageable with the side of the blade opposite that on which the scraper arm is disposed, to limit movement of the blade radially relative to the scraper arm, said bracket having a slot formed therein extending circumferentially with respect to the arm; and a pin removably received in the lower end of said scraper arm and extending radially into said slot and being freely movable therein upon pivotal movement of said blade and engageable with the circumferentially extending edges of said slot to limit movement of the blade axially relative to the scraper arm.

* * * * *